May 31, 1955
A. F. MELONE
2,709,372
CLUTCH FOR V-BELT SHEAVE SECTIONS
Filed July 15, 1949
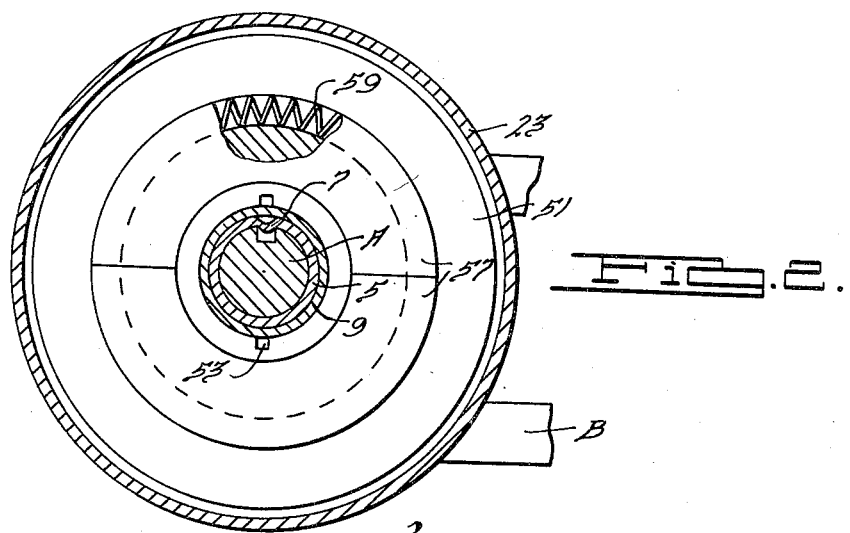
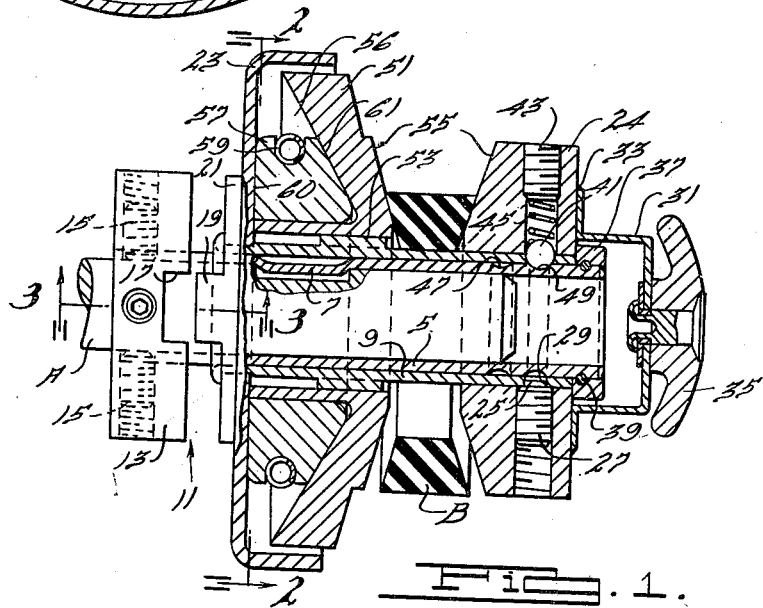
INVENTOR.
Angelo F. Melone.
BY
Harness, Dickey & Pierce
ATTORNEYS.

United States Patent Office 2,709,372
Patented May 31, 1955

2,709,372

CLUTCH FOR V-BELT SHEAVE SECTIONS

Angelo F. Melone, Detroit, Mich.

Application July 15, 1949, Serial No. 104,931

6 Claims. (Cl. 74—230.17)

This invention relates to power transmission devices and in particular to a lagging clutch for automatically interconnecting and disconnecting a pulley structure and a power source.

Transmission devices of the type herein referred to are used to effectuate a driving connection between a prime mover and machinery to be driven thereby, an illustrative application being a pulley structure for connecting the gas engine to the wheels of a power-operated lawn mower or bicycle. The undesirability of establishing a direct drive between the prime mover and the machinery will be fully appreciated by those in the art since it would throw a terrific strain upon the prime mover when attempting to accelerate both it and the machinery from a position of rest. Hence, means controlled by the speed of operation of the prime mover have been developed to provide a delayed power-transmission connection between it and the machinery so that the latter will be gradually and automatically accelerated in accordance with the capabilities of the prime mover.

For installations involving relatively small transfers of power, the lagging clutch-type pulley structures such as shown in Thomas Patents 2,144,443 and 2,180,217 are well adapted. These structures comprise cooperating parallel pulley sections, one of which is forced to slide toward the other by centrifugal force as the prime mover accelerates. This effects a delayed power connection that prevents shock loads on the engine, and, as taught by Hartmann 895,855 and Vincent 1,068,188, may also be arranged to provide a variable pitch pulley structure.

While the centrifugal and other speed responsive clutch devices are fundamentally well suited to provide such delayed power transmission connections, they have in actual use been disappointing. One important shortcoming has been that they invariably transmit at least some power to the machinery when the prime mover is idling at a speed less than that required to effectuate an efficient drive connection. In the case of bicycles and lawn mowers, for example, this is dangerous and extremely annoying since it often makes it necessary to shut off the engine completely, even though only a temporary cessation of movement is desired.

When used with gas engines, a further annoyance is developed. When these engines are started, it is almost inevitable that they are briefly raced due to an excess of fuel furnished for starting purposes. The speeds reached, though held only momentarily, are often enough to operate the lagging clutch so that the machinery is connected to the engine. This results in grabbing of the clutch and jerking of the machinery with resultant shock loads and perhaps continued undesired motion or displacement.

The present invention overcomes these and other difficulties associated with the basic lagging clutch structures by providing a single compact clutching unit incorporating means whereby it may be manually connected to and disconnected from the prime mover. Thus only when it is desired that the clutch should function automatically, need it be connected to the prime mover. It is therefore possible, by manual disconnection, to prevent creeping, grabbing, and other annoyances that arise from automatic actuation at undesired times.

The invention is illustrated in the accompanying drawings in which:

Figure 1 is an axial section through one embodiment of the invention;

Fig. 2 is a cross section taken on line 2—2 of Fig. 1; and

Fig. 3 is a cross section taken on line 3—3 of Fig. 1.

By way of illustration, the improved power transmitting device is shown in a form that is adapted to operatively connect a drive shaft A to a V belt B, it being clear that in actual use the shaft A is driven by a suitable source of power and the belt B drives the desired machinery.

Power is taken from the shaft A by a sleeve 5 which fits thereon and is keyed thereto at 7 for rotation with the shaft. A second sleeve 9 is slidably and rotatably mounted on the inner sleeve 5. The sleeves are selectively manually interconnected for unitary rotation by means of a dog clutch 11. This comprises a clutch plate 13 that is affixed by radial set screws 15 to the end of the inner sleeve 5 which extends on the shaft A beyond the end of the outer sleeve 9. The clutch plate 13 has axially extending recesses 17 opening into its inner radial face that are adapted to receive the dogs 19. The dogs 19 are formed on a suitable plate 21 that is affixed by welding, screws, peening, or the like, together with the web of a radial cover plate 23, to the end of the outer sleeve 9. Thus, when the dogs 19 are engaged in the recesses 17, power will flow from shaft A, through key 7 to the inner sleeve 5, thence to set screws 15 to plate 13, and then through the dogs 19 and plate 21 to the outer sleeve 9.

It is apparent that axial movement of the sleeve 9 will serve to operate the dog clutch 11. This is accomplished manually through the medium of means disposed at the end opposite the shaft A. This means includes a pulley sheave section 24 that is affixed to the end of the outer sleeve 9 by means of nibs 25 on the ends of radial set screws 27 which fit in suitable holes 29 in the outer sleeve 9. A hat shaped cover 31 fits over the ends of the sleeves 5 and 9 and is fixedly secured by brazing or the like at 33 to the radial outer face of the sheave section 24. A handle 35 is rotatably mounted in the cover plate 31. It is evident that by grasping this handle and thrusting it to the left, the sheave section 24 and therefore the outer sleeve 9 will move leftwardly to engage the dogs in the recesses 17. Conversely, by pulling upon the handle 35 the sleeve 9 will be moved to the right to disengage the clutch 11, the extent of rightward movement being limited by a stop washer 37 that is suitably secured, as by a lock ring 39, to the end of the inner sleeve 5. Disengagement can be accomplished despite the fact that the sleeve 9 is rotating since the handle 35 is rotatable in the cover 31.

The outer sleeve 9 is yieldably held in either the clutch engaged or disengaged position by means of a spring pressed detent ball 41 that is fitted in a radial aperture in the pulley sheave section 24. A set screw 43 serves to regulate the pressure of spring 45 on the ball 41. Peripheral grooves 47 and 49 in the inner sleeve 5 cooperate with the ball 41 to yieldably axially position the outer sleeve 9 in either of the two desired positions.

The outer sleeve carries and drives the means for automatically energizing belt B at a predetermined speed of rotation of the shaft A. This may, for example, be a centrifugal clutch mechanism similar to that described in the aforementioned Thomas patents. Thus, there is a pulley sheave section 51 that is splined or keyed to the outer sleeve 9 as shown at 53 so that it is rotated by the sleeve but capable of axial movement on the sleeve. The inner pulley engaging faces 55 of both sheaves 24 and 51 are, of course, inclined and the outer face 56 of sheave section 51 is also inclined outwardly. A plurality of weights 57 are circumferentially disposed about the sleeve 9 and may, as shown, be mounted upon an axially extending hub of the sheave 51. They are yieldably held in an innermost radial position by a circumferential tension or garter spring 59. The weights have radial faces 60 which bear upon and are guided by the radial face of the cover 23. The weights also have inclined faces 61 which engage the inclined pulley face 56, and, if desired, radial pins or the like (not shown) may be employed to guide radial movement of the weights so that no angular slippage thereof relative to the other rotating members takes place. Upon outward radial movement of the weights under the influence of centrifugal force, which is resisted by spring 59, they wedge the sheave section 51 toward the sheave section 24. At a predetermined speed, dependent upon the magnitude of the weights 57 and the resistance of spring 59, the sheave section 51 will advance far enough to the right to force the V belt B against the sheave section 24. Both sheave sections will therefore drive the belt B and, if the speed increases, the added axial force of the wedge weights on the sheave 51 will result in a slight increase in pitch of the belt B as the sheave section 51 moves closer to sheave section 24. If not desired, this can be avoided, of course, by providing a suitable stop to limit axial movement of the sheave section 51.

In lagging clutches as heretofore known, the member corresponding to sleeve 9 was directly connected to the shaft A at all times so that it rotated continuously during operation of the prime mover. In the absence of a floating, rotary support for the belt B, it will be recognized that the force of gravity holding the belt on the sleeve was sufficient to cause chafing of the belt and often creeping of the equipment driven thereby. This and other difficulties are now eliminated by the invention which makes it possible to disconnect the outer sleeve 9 from the shaft A by simple axial movement of the handle 35.

It is evident that modifications may be made in the specific form of the invention selected for illustration, hence it is not intended to limit the scope of the invention thereto.

What is claimed is:

1. A power transmission device comprising an inner sleeve, means for drivably securing said sleeve to a rotary drive shaft, an outer sleeve slidably and rotatably mounted on the inner sleeve, a clutch plate mounted on an end of one of the sleeves and having axially extending recesses, clutch teeth affixed to an end of the other sleeve and adapted upon relative axial movement of the sleeves to engage said recesses whereby said outer sleeve is drivably connected to said inner sleeve, a V belt sheave section affixed to the outer sleeve, handle means at the sheave section end for axially moving the outer sleeve to engage the clutch teeth and recesses, a slidable V belt sheave section on the outer sleeve and connected thereto for rotation thereby, said slidable sheave section being movable toward and from the fixed sheave section whereby a V belt may be operatively connected or disconnected from the outer sleeve, and means responsive to the speed of rotation of the outer sleeve for slidably moving said slidable sheave section.

2. A power transmission device comprising an inner sleeve, means for drivably securing said sleeve to a rotary drive shaft, an outer sleeve slidably and rotatably mounted on the inner sleeve, a clutch plate mounted on an end of one of the sleeves and having axially extending recesses, clutch teeth affixed to an end of the other sleeve and adapted upon relative axial movement of the sleeves to engage said recesses whereby said outer sleeve is drivably connected to said inner sleeve, a V belt sheave section affixed to the outer sleeve, handle means at the sheave section end for axially moving the outer sleeve to engage the clutch teeth and recesses, a slidable V belt sheave section on the outer sleeve and connected thereto for rotation thereby, said slidable sheave section being movable toward and from the fixed sheave section whereby a V belt may be operatively connected or disconnected from the outer sleeve, and means movable by centrifugal force due to rotation of the outer sleeve for sliding the slidable sheave section on the outer sleeve.

3. A power transmission device comprising an inner sleeve, means for drivably securing said sleeve to a rotary drive shaft, an outer sleeve slidably rotatably mounted on the inner sleeve, clutch means engageable upon relative axial movement of the sleeves to provide a rotary drive connection therebetween, said clutch means being located at the end of the device which receives the drive shaft, detent means between the sleeves to yieldably position them in either the clutch engaged or the clutch disengaged position, handle means, means connecting the handle means to one of the sleeves at the end opposite the clutch means for axially shifting said outer sleeve to engage and disengage the clutch means, a first V belt sheave section fixed to the outer sleeve, a second V belt sheave section drivably but slidably secured to the outer sleeve and cooperable with the first sheave section to drive a V belt, and speed responsive means driven by the outer sleeve for sliding the second sheave section toward the first sheave section.

4. In a lagging clutch pulley structure, an inner sleeve, means for drivably securing said sleeve to a rotary drive shaft, an outer sleeve slidably and rotatably mounted on the inner sleeve, a dog clutch secured to said sleeves and engageable upon axial movement of the outer sleeve on the inner sleeve to provide a rotary drive connection therebetween, said clutch means being located at the end of the device which receives the drive shaft, a radial pulley sheave section fixed to the outer sleeve at the end opposite the dog clutch, said inner sleeve having a pair of axially spaced annular grooves in a portion embraced by the sheave section, said outer sleeve and said sheave section having aligned radial apertures, a spring pressed detent in said apertures adapted to engage said annular grooves to yieldably hold the outer sleeve in a clutch engaged or a clutch disengaged position, a stop on the end of the inner sleeve engageable with the outer sleeve to limit axial clutch disengaging movement thereof, a cover over the stop ends of the sleeves and fixed to the sheave section, and a handle rotatably secured to the cover whereby the outer sleeve may be moved axially to operate the dog clutch.

5. In a power transmission device, the combination of an inner sleeve, means for drivably securing said sleeve to a rotary drive shaft, an outer sleeve slidably and rotatably mounted on the inner sleeve, a pair of cooperating belt sheave sections mounted on said outer sleeve for rotation therewith, one of said sheave sections being fixed on the outer sleeve and the other being slidable thereon, a centrifugally responsive means for sliding said slidable sheave section to effect operative connection of said sheave sections with a belt located between said sections, clutch means engageable upon relative axial movement of the sleeves to provide a rotary drive connection therebetween, handle means, and means connecting the handle means to one of the sleeves to adapt said handle means for axially shifting said sleeve to engage and disengage the clutch means.

6. A power transmission device comprising an inner sleeve, means for drivably securing said sleeve to a rotary drive shaft, an outer sleeve slidably and rotatably mounted on the inner sleeve, clutch means engageable upon relative axial movement of the sleeves to provide a rotary drive connection therebetween, said clutch means being located at the end of the device which receives the drive shaft, handle means, means connecting the handle means to one of the sleeves at the end opposite the clutch means to adapt said handle means for axially shifting said sleeve to engage and disengage the clutch means, a first V belt sheave section fixed to the outer sleeve, a second V belt sheave section drivably but slidably secured to the outer sleeve and cooperable with the first sheave to drive a V belt, and speed responsive means driven by the outer sleeve for sliding the second sheave section toward the first sheave section to effect operative connection of said sheave sections with a V belt located between said sections.

References Cited in the file of this patent

UNITED STATES PATENTS

| | | |
|---|---|---|
| 2,074,510 | Junkers | Mar. 23, 1937 |
| 2,144,443 | Thomas | Jan. 17, 1939 |
| 2,215,831 | Heyer | Sept. 24, 1940 |
| 2,378,549 | Gruenhagen | June 19, 1945 |
| 2,453,580 | Lusk | Nov. 9, 1948 |